United States Patent
Burnett et al.

[15] 3,687,333
[45] Aug. 29, 1972

[54] PRESSURE VESSEL SEALING STRUCTURE

[72] Inventors: Edward L. Burnett; Eugene V. Stack, both of Bay City, Mich. 48706

[73] Assignee: The Dow Chemical Company, Midland, Mich.

[22] Filed: Nov. 23, 1970

[21] Appl. No.: 91,684

[52] U.S. Cl.....................................220/46 P
[51] Int. Cl. ...............................B65d 53/00
[58] Field of Search.......................220/46 R, 46 P

[56] References Cited

UNITED STATES PATENTS

| 3,458,081 | 7/1969 | Sherman | 220/46 R |
| 2,987,218 | 6/1961 | Erickson | 220/46 R |
| 3,279,644 | 10/1966 | Robertson | 220/46 P |

FOREIGN PATENTS OR APPLICATIONS

| 972,812 | 9/1959 | Germany | 220/46 R |

Primary Examiner—M. Henson Wood, Jr.
Assistant Examiner—Edwin D. Grant
Attorney—Griswold & Burdick, Richard G. Waterman and Robert B. Ingraham

[57] ABSTRACT

A lightweight sealing structure is provided for pressure vessels wherein a resilient ring carrying two O-rings is positioned adjacent the closure and wall of the vessel. Internal pressure urges the resilient ring and O-rings into sealing engagement with the internal surface of the vessel.

3 Claims, 2 Drawing Figures

PATENTED AUG 29 1972　　　　　　　　　　　　3,687,333

INVENTORS.
Edward L. Burnett
Eugene V. Stack
BY
Robert B. Ingraham
AGENT

PRESSURE VESSEL SEALING STRUCTURE

High pressure seals have generally been cumbersome, complicated, expensive, readily damaged and the like. Frequently, they require precision machining which in turn requires that great care be exercised while handling the seals during opening and/or closing.

It would be desirable if there were available an improved low cost, high pressure seal.

It would also be desirable if such a high pressure seal did not require highly precise machine work.

It would further be desirable if such a high pressure seal were available and could be readily adapted to simply constructed vessels.

These features and other advantages in accordance with the present invention are achieved in a pressure vessel having a seal, the seal comprising a distendable and beneficially elastic annular member having a first face lying in a plane generally perpendicular to the axis of the annular member, the first face defining an annular outwardly facing groove, the groove having an O-ring disposed therein, the first face being disposed generally parallel to a first surface of the pressure vessel to be sealed, the annular member having a second annular face disposed in a direction generally perpendicular to the axis of the member, the distendable member defining a second O-ring receiving groove in the second face, the second O-ring receiving groove being generally peripherally disposed to engage a second surface of the pressure vessel to be sealed, an O-ring disposed in the second O-ring groove, and means to secure the annular ring to a vessel cover member.

Further features and advantages of the present invention will become more apparent from the following specification taken in connection with the drawing wherein.

Figure 1:
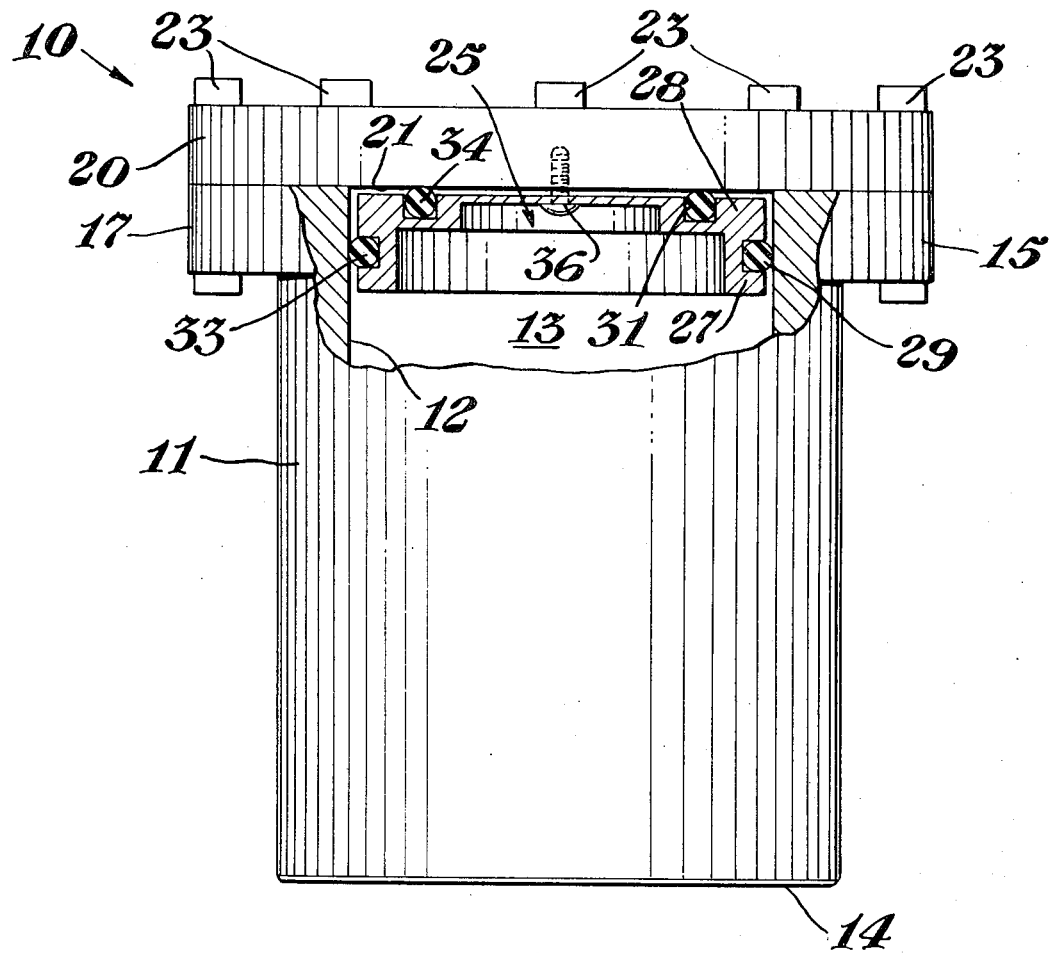
FIG. 1 is a schematic partially cutaway view of the present invention.

In FIG. 1 there is schematically depicted a pressure vessel generally designated by the reference numeral 10. The pressure vessel 10 comprises a body portion 11 having a first annular generally cylindrical wall surface 12. The body 11 defines an internal generally cylindrical cavity 13. The body 11 has a closed end 14 and an open end 15. The open end 15 defines a flange 17. A closure member 20 is in operative engagement with the opening 15. The closure member 20 defines an internal second sealing surface 21. The closure member 20 and the flange 17 are selectively maintained in fixed relationship by a plurality of clamping members or bolts 23. Disposed within the cavity 13 is a sealing member generally designated by the reference numeral 25. The sealing member 25 comprises an axial flange portion 27 and a radial flange portion 28. The axial flange portion 27 defines an O-ring receiving groove 29, while the radial flange portion 28 defines a second O-ring receiving groove 31. A first O-ring or side wall sealing O-ring is disposed within the groove 29. A second O-ring or end sealing O-ring 34 is disposed within the grove 31. The O-rings 33 and 34 are of sufficient size to permit engagement with the adjacent surfaces 12 and 21 of the vessel. A seal ring securing means or bolt 36 secures the seal ring 25 to the cover member 20 in such a manner that the flanges 27 and 28 of the ring may move radially and axially under pressure.

Figure 2:
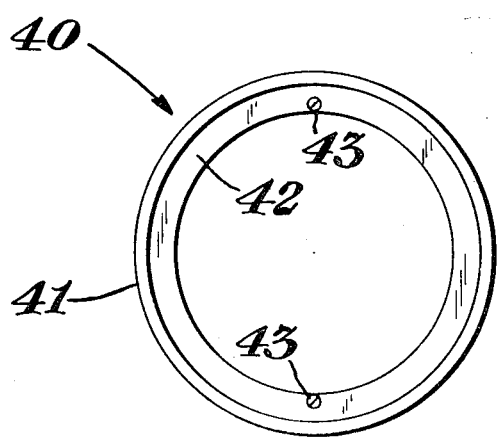
FIG. 2 is a schematic representation of an alternate form of seal ring.

In FIG. 2 an alternate configuration of the seal ring generally designated by the reference numeral 40 is shown. The ring 40 has an axial flange 41 containing an O-ring not shown, and a generally radially disposed flange 42 containing an O-ring, not shown. Ring support means 43 are generally diametrically opposed and pass through the radial flange 42. The ring support means 43 may consist of machine screws fastened through the ring and into the closure means, such as the closure 20 of FIG. 1.

In operation of the seal in accordance with the present invention, a seal ring such as the ring 25 is prepared from material either like or unlike the material from which the pressure vessel is made. The essential and critical feature is that the ring deform radially outwardly at a rate greater than the outward deformation of the vessel on the application of internal pressure to the vessel. Thus, as shown in the arrangement pictured in FIG. 1, as the pressure in the cavity 13 is increased, O-rings 33 and 34 are forced into tighter engagement with the surfaces 12 and 21. As the pressure increases further, the ring 25 increases in diameter at a rate greater than the rate of increase in diameter of the pressure vessel, thereby reducing the clearance between the axial and radial flanges and the corresponding vessel surfaces, thus, in effect providing a tighter seal as pressure increases. As depicted in FIG. 1, the ring has a generally cup-like configuration and is suspended by a single point at the center of the cup. The attachment by the bolt 36 may be rigid or loose, as desired, but the flanges 27 and 28 are free to move as pressure is applied internally. Generally it is desirable that the ring not be deformed beyond its elastic limit if the vessel is to be frequently opened or closed. However, if the elastic recovery of the ring is greater than that of the vessel, adequate clearance is maintained for assembly and disassembly. If infrequent opening or single use is required, elastic recovery of the ring is not necessary.

When employing the embodiment of FIG. 2, it is desirable that sufficient clearance between the bolt bodies 43 and the appropriate holes or openings in the ring be provided to permit free expansion of the ring. The closure in accordance with the present invention conveniently may be removed with relatively little effort when the internal pressure of the vessel is reduced.

Steel vessels employing sealing rings generally as depicted in FIG. 2 are found eminently satisfactory at pressures up to 5,000 pounds per square inch and permit ready opening and closing of the vessels and are also eminently satisfactory under higher pressures.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A pressure vessel having
a seal, the seal comprising
a distendable annular member having a generally cup-like configuration and having a first face lying in a plane generally perpendicular to the axis of the annular member, the first face defining an annular upwardly facing groove, the groove having an O-ring disposed therein, the first face being disposed generally parallel to a first surface of the pressure vessel to be sealed, the annular member having a second face disposed in a direction generally perpendicular to the axis of the member, the distendable member defining a second O-ring receiving groove in the second face, the second O-ring receiving groove being generally peripherally disposed to engage a second surface of the pressure vessel to be sealed, an O-ring disposed in the second O-ring groove, and means to generally centrally affix the annular ring to a vessel cover member.

2. A pressure vessel having an opening, an internal cavity and a cover closing the opening, a seal, the seal comprising a distendable elastic annular member having a generally cup-like configuration and generally centrally affixed to the cover, the member having a first face lying in a plane generally perpendicular to the axis of the annular member and parallel to an internal surface of the cover, the first face defining an annular outwardly facing O-ring receiving groove having a first O-ring disposed therein, the annular member having a second face disposed in the direction generally perpendicular with the axis of the member and generally parallel to a side wall of the pressure vessel, the distendable member defining a second O-ring receiving groove in the second face, an O-ring disposed in the second O-ring receiving groove, the first and second O-rings contacting the inner surface of the vessel cover and an inner wall of the vessel, respectively, and on application of internal pressure to the vessel the annular member being more readily distended than the vessel, thereby forcing the O-rings against the surfaces to be sealed.

3. The vessel of claim 2 wherein the opening has a generally circular configuration.

* * * * *